United States Patent [19]
Dishner et al.

[11] Patent Number: 4,841,202
[45] Date of Patent: Jun. 20, 1989

[54] SPEED-LIMITED ELECTRICALLY COMPENSATED CONSTANT SPEED DRIVE

[75] Inventors: Bryan W. Dishner, Roscoe; Vijay K. Maddali, Rockford; P. John Dhyanchand, Rockford, all of Ill.

[73] Assignee: Sundstrand Corporation, Rockford, Ill.

[21] Appl. No.: 138,344

[22] Filed: Dec. 28, 1987

[51] Int. Cl.[4] .............................................. H02P 9/00
[52] U.S. Cl. ...................................... 318/14; 318/11; 318/111; 322/40; 290/4 C
[58] Field of Search ......................................... 318/9–14, 318/45, 49–50, 86, 111, 332, 333; 290/4 C, 4 R, 7, 1 R, 11, 14, 19; 322/12, 13, 16, 39, 40

[56] References Cited

U.S. PATENT DOCUMENTS

| | | | |
|---|---|---|---|
| 4,572,961 | 2/1986 | Borger | 290/4 R |
| 4,661,762 | 4/1987 | Baker. | |
| 4,692,671 | 9/1987 | Dishner et al. | 318/11 |
| 4,695,776 | 9/1987 | Dishner et al. | 318/14 |
| 4,734,626 | 3/1988 | Sutrina et al. | |
| 4,743,812 | 5/1988 | Dishner. | |

OTHER PUBLICATIONS

J. J. Cathey, "*Electrically Compensated Aircraft Alternator Drive*", 1983.
Chetty, Subiah, Dhyanchand and Fair, "*Design of 25 KW (peak) 3-Phase Full-Wave SCR Bridge Regulator*", 1983.

*Primary Examiner*—William M. Shoop, Jr.
*Assistant Examiner*—David Martin
*Attorney, Agent, or Firm*—Wood, Dalton, Phillips, Mason & Rowe

[57] ABSTRACT

An electrically compensated constant speed drive which is speed limited so that power flow through the speed compensation link is unidirectional includes a permanent magnet generator which is interconnected with a permanent magnet motor by a power converter. The permanent magnet generator and the permanent magnet motor are controlled by first and second independent control loops. The power converter includes an AC/DC converter coupled to electrical power windings of the permanent magnet generator, a filter coupled to the output of the AC/DC converter and an inverter coupled between the filter and electrical power windings of the permanent magnet motor. The permanent magnet generator, AC/DC converter, filter and the first control loop together develop a voltage on a DC bus. The voltage on the DC bus, which is coupled to the inverter, is sufficient to operate the permanent magnet motor with the required speed and torque, and thus the second control loop need not implement a voltage control scheme, such as a PMW control.

8 Claims, 5 Drawing Sheets

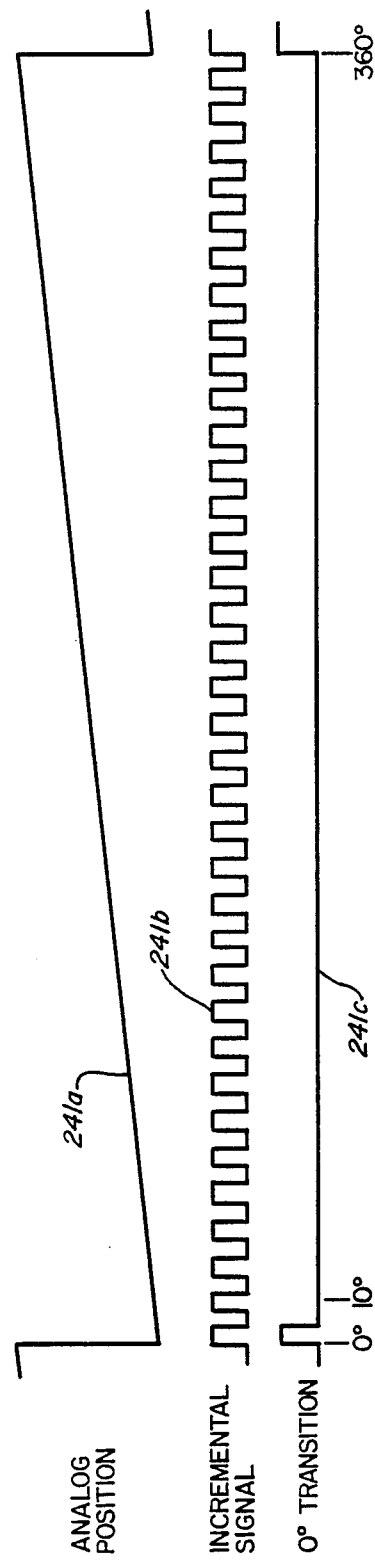

SPEED-LIMITED ELECTRICALLY COMPENSATED CONSTANT SPEED DRIVE

TECHNICAL FIELD

The present invention relates generally to constant speed drives, and more particularly to an electrically compensated constant speed drive for developing constant speed motive power from variable speed motor power produced by a prime mover.

BACKGROUND ART

Constant speed drives (CSD's) are typically used to convert variable speed motive power from a prime mover into constant speed motor power for driving a generator so that the generator develops constant frequency electrical power. Electrically compensated CSD's (ECCSD'S) have been proposed for use in applications where conventional hydromechanical CSD's have been found to be inadequate. Known ECCSD'S include a mechanical differential speed summer having a first input shaft coupled to the output shaft of the prime mover, a second input shaft and an output shaft at which the constant speed motor power is developed. A speed compensation link is coupled to the second input shaft of the speed summer and includes a first or compensating permanent magnet machine having a motive power shaft coupled to the second input of the differential speed summer and electrical power windings. A motive power shaft of a second or control permanent magnet machine is coupled to either the output shaft of the prime mover or the output of the differential speed summer. Electrical power is transferred between the windings of the first permanent magnet machine and electrical power windings of the second permanent magnet machine by a power converter so that the compensating permanent magnet machine develops compensating speed of a magnitude and direction which causes the output of the differential to be driven at the desired constant speed. Borger U.S. Pat. No. 4,572,961 discloses such a constant speed drive wherein the power converter comprises an AC/DC link converter coupled to the power windings of the control permanent magnet machine, a filter coupled to the output of the DC link converter which develops a DC link voltage and an inverter which converts the DC link voltage into AC power which is provided to the compensating permanent magnet machine. A control for the DC link converter is responsive to a load speed error signal and other speed related signals to produce the DC link voltage. The inverter is responsive to the current in the windings of the second permanent magnet machine to maintain a desired commutation angle.

Other ECCSD'S are disclosed in Dishner et al U.S. Pat. Nos. 4,692,671 and 4,695,776, assigned to assignee of the instant application and the disclosures of which are hereby incorporated by reference. The former patent discloses an "input differential" configuration in which the first permanent magnet machine is coupled to the output of the differential speed summer whereas the latter patent discloses an "output differential" configuration in which the first permanent magnet machine is coupled to the output shaft of the prime mover. In both patents, a power converter interconnects the electrical power windings of the first and second permanent magnet machines. The power converter includes a bidirectional AC/DC converter coupled to the electrical power windings of the first permanent magnet machine, a bidirectional DC/DC converter coupled to the first AC/DC converter and a second bidirectional AC/DC converter coupled between the DC/DC converter and electrical power windings of the second permanent magnet machine.

All of the foregoing patents suggest that the power flow through the power converter may be either bidirectional or unidirectional. However, the power converter disclosed in the '671 and '776 patents is expressly designed for bidirectional power flow. The '961 patent does disclose that the DC link converter and inverter can be used for unidirectional power flow; however, the circuit for controlling the DC link converter is not independent from the circuit for operating the inverter. Therefore, adjustment or a change in one circuit may necessitate a change in the other control circuit for proper operation of the ECCSD. Further, the control for operating the DC link converter and the inverter are overly complex due to the need to sense many operating parameters of the drive.

DISCLOSURE OF INVENTION

In accordance with the present invention, an ECCSD includes a power converter in the form of a phase controlled rectifier bridge, a filter and an inverter which are controlled by control loops in a simple and effective manner.

More particularly, there is disclosed herein an ECCSD for developing constant speed motor power at a drive output shaft from variable speed motive power provided by a prime mover at an input shaft of the drive wherein the speed of the input shaft is limited so that such speed is equal to or less than the speed required to maintain the drive output shaft at the constant speed. The drive includes a differential having a first input coupled to the input shaft, a second input and an output coupled to the output shaft, a permanent magnet generator (PMG) having a motive power shaft coupled to the input shaft and electrical power windings which develop AC power and a permanent magnet motor (PMM) having a motive power shaft coupled to the second differential input and electrical power windings. An AC/DC converter is coupled to the electrical power windings of the PMG for developing a DC voltage on a DC link from the AC power developed by the PMG. A DC/AC converter is coupled between the AC/DC converter and the electrical power windings of the PMM for developing AC power from the DC power developed by the AC/DC converter to operate the PMM. A first control loop controls the AC to DC converter responsive to an operating parameter of the PMG while the second control loop separate from and independent of the first control loop controls the DC/AC converter whereby the PMM develops compensating motor power at a speed sufficient to maintain the drive output shaft at the desired speed.

In the preferred embodiment, the first control loop includes means for deriving a signal representing the speed of the input shaft of the drive, means for deriving a DC link voltage command signal from the input shaft speed signal representing the magnitude of the DC voltage which must be provided to the DC/AC converter to operate the PMM, means for deriving an error signal from the DC link voltage command signal representing the deviation of the actual DC/AC converter input voltage magnitude from the commanded magnitude and means for controlling the AC/DC converter in accordance with the error signal.

The second control loop is responsive to an error signal representing the deviation of the output speed of the drive from a commanded or desired value. The second control loop is also responsive to position signals developed by a position sensor which detects the position of the motive power shaft of the PMM. The DC/AC converter is controlled in accordance with the position and error signal so that the PMM is driven at the required speed and torque.

The magnitude of the DC voltage required to operate the PMM with the required operating characteristics is determined by the first control loop and the AC/DC converter. Thus, there is no need to provide the AC/DC converter with voltage control capability, such as a pulse width modulation circuit, or the like. Also, the independence of the first and second control loops simplifies the design of the control loops and renders the entire drive less susceptible to complete failure as a result of malfunction of a component in one of the loops.

BRIEF DESCRIPTION OF THE DRAWINGS

FIG. 5 comprises a series of waveform diagrams illustrating the signals developed by the position sensor shown in FIG. 2.

BEST MODE FOR CARRYING OUT THE INVENTION

Figure 1:
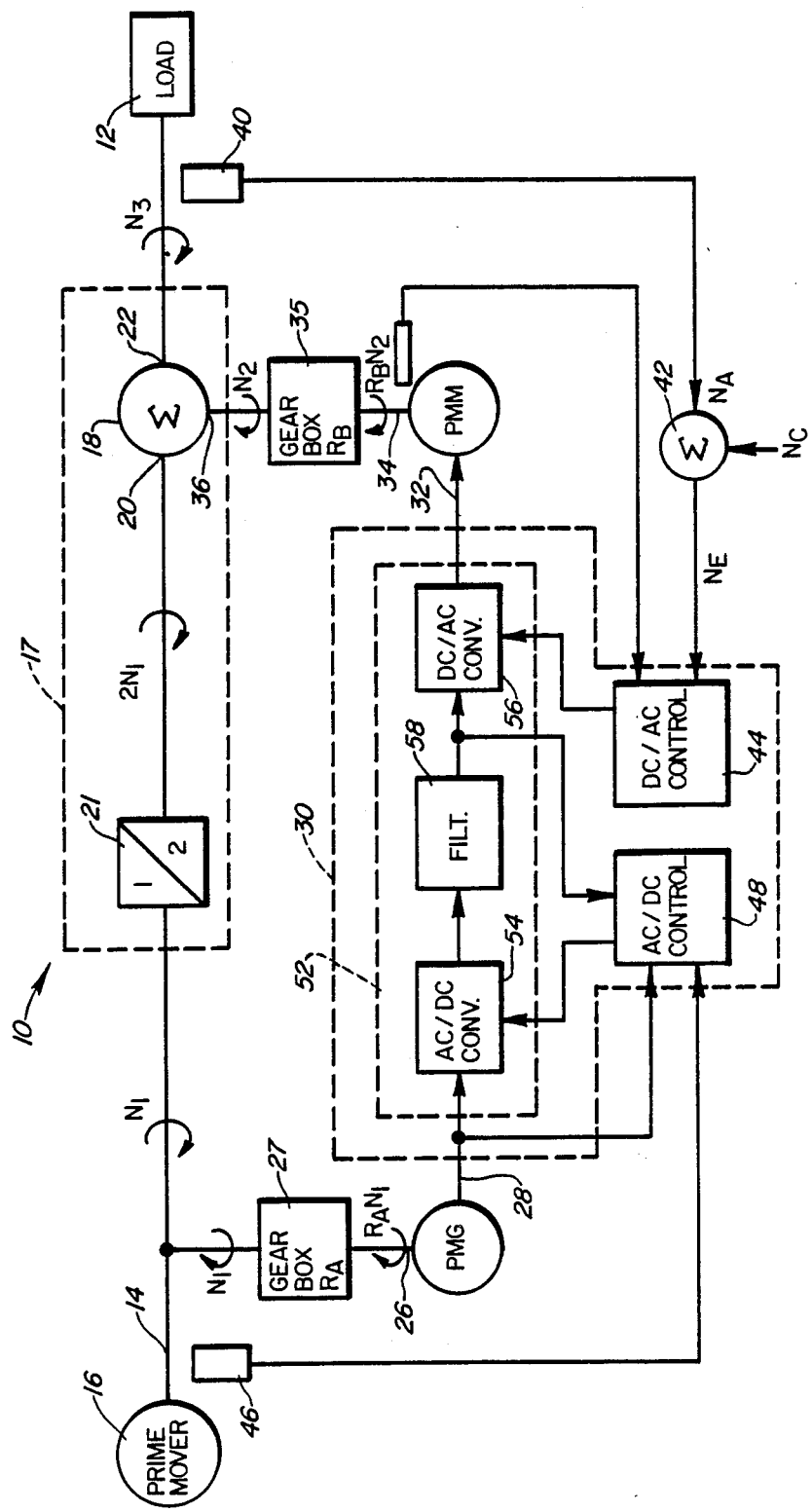
FIG. 1 is a block diagram of the electrically compensated constant speed drive of the present invention.

Referring now to FIG. 1, there is illustrated an electrically compensated constant speed drive (ECCSD) 10 which develops constant speed motive power for driving a load 12 from variable speed motive power developed at an input shaft 14 of the drive by a prime mover 16. The load 12 may comprise, for example, a generator. The ECCSD 10 includes a mechanical differential 17 comprising a speed summer 18 having a first input shaft 20 which is coupled by the input shaft 14 to the prime mover 16. The differential 17 effects a 2:1 speed increase which is represented by the block 21. The speed summer further includes an output shaft 2 which is coupled to the load 12 and which comprises an output shaft of the ECCSD 10.

A first or control permanent magnet machine which is operated as a permanent magnet generator (PMG) includes a motive power shaft 26 which is coupled by a gear box 27 to the input shaft 14 of the drive 10. The PMG further includes electrical power windings which are coupled by conductors 28 to a power converter 30. A second or a speed compensating permanent magnet machine which is operated as a permanent magnet motor (PMM) includes electrical power windings which are coupled by conductors 32 to the power converter 30. The PMM further includes a motive power shaft 34 which is coupled through a gear box 35 to a second input 36 of the differential speed summer 18.

The gear boxes 27 and 35 are speed multipliers having speed ratios of $R_A, R_B$, respectively. More specifically, if $N_1$ is the output speed of the prime mover 14, the speed of the motive power shaft 26 of the PMM1 is equal to $R_A N_1$. Likewise, if the speed of the shaft coupled to the input 36 of the speed summer 18 is $N_2$, then the speed of the motive power shaft 34 of the PMM is equal $R_B N_2$.

The speed of the output shaft 22 of the speed summer 18 is detected by a speed sensor 40. The speed sensor 40 develops a speed signal which is coupled to one input of a summing junction 42. A second input of the summing junction 42 receives a speed command signal $N_c$ representing the desired output speed of the speed summer 18. The summing junction 42 subtracts the two signals at the inputs and develops a speed error signal $N_E$ representing the difference between the actual output speed of the speed summer 18 and the commanded speed. The speed error signal is coupled to a DC/AC control loop or circuit 44 which is a part of the power converter 30.

A second speed sensor 46 develops a signal representative thereof of the speed of the input shaft. This signal is coupled to an AC/DC control loop or circuit 48 which is also a part of the power converter 30.

The power converter 30 further includes power switching circuitry 52 which is controlled by the control loops 44, 48. The power switching circuitry 52 comprises an AC/DC converter 54 which is coupled to the electrical power windings of the PMG by the conductors 28, a DC/AC converter or inverter 56 coupled to the electrical power windings of the PMM by the conductors 32 and a filter coupled between the AC/DC converter 54 and the inverter 56.

Briefly, the speed of the prime mover 16 is limited to be equal to or less than the speed required to maintain the speed of the output shaft 22 of the differential speed summer 18 at the desired constant speed. Thus, power must be transferred from the PMG to the PMM through the power converter 30 so that the PMM is operated to provide the proper compensating speed to the speed summer 18.

The limiting of the speed applied to the input shaft 14 of the drive 10 may be accomplished by limiting the speed of the prime mover 16 itself, or by utilizing a speed multiplier having an appropriate gear ratio to maintain the prime mover speed below "straight-through", i.e., the speed of the shaft 14 which results in rotation of the output shaft 22 at the desired speed while no compensating speed is being provided by the PMM.

Figure 2:
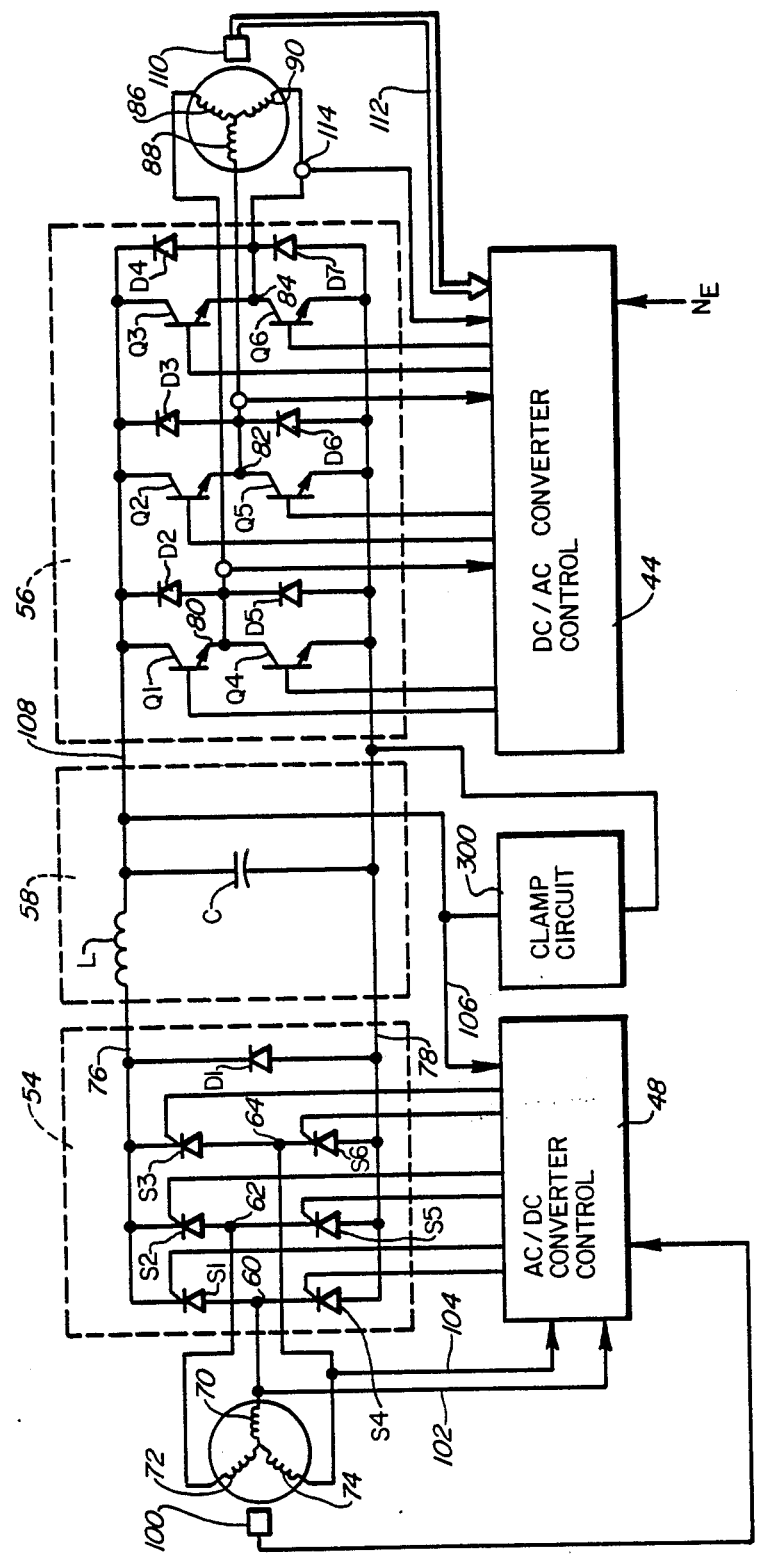
FIG. 2 is a combined simplified schematic and block diagram of the power converter shown in FIG. 1.

Referring also to FIG. 2, the AC/DC converter control loop 48 operates three series-connected pairs of silicon controlled rectifiers (SCR's) which are connected together in a three-phase, full wave bridge configuration. Junctions 60, 62 and 64 between the SCR's of each pair are coupled to armature windings 70, 72 and 74, respectively, of the PMG.

The AC/DC converter 54 further includes a diode D1 coupled across output terminals 76, 78. The output terminals 76, 78 are coupled to an inductor L and a capacitor C which together comprise the filter 58.

The DC/AC converter control loop 44 operates a three-phase inverter comprising power transistors Q1-Q6 connected in a conventional bridge configuration together with antiparallel diodes D2-D7. Phase outputs 80, 82 and 84 are coupled to stator windings 86, 88 and 90 respectively of the PMM. The inverter 56 is coupled across the capacitor C of the filter 58.

As mentioned previously, the AC/DC control circuit 48 is responsive to the speed of the input shaft 14 of the drive 10. This speed may be sensed in other ways, for example by sensing the speed of the motive power shaft 26, or, since the PMG is a synchronous machine, by sensing the frequency of the voltage or current in the PMG windings 70, 72 and 74. There is shown for this purpose in FIG. 2 a current sensor 100 which replaces the speed sensor 46 shown in FIG. 1.

The AC/DC converter control circuit 48 is also responsive to the voltage between two phases of the PMG armature output. Such sensing is accomplished by lines 102, 104 which are coupled to circuitry described hereinafter. In addition, a conductor 106 couples the voltage appearing on a DC link 108 between the filter 58 and the inverter 56 to the converter control 48.

The DC/AC converter control 44 is responsive to the output speed error signal NE as developed by the summing junction 42 and a series of position signals developed by a position sensor 110. The position sensor 110 generates three separate position signals over lines 112 which are coupled to the converter control 44. The rotor position sensor is described and claimed in Vaidya et al U.S. patent application Ser. No. 941,850 filed Dec. 15, 1986 entitled "Position Detecting Apparatus", assigned to the assignee of the instant application and the disclosure which is hereby incorporated by reference.

The converter control loop 44 is further responsive to a current signal representing the current in one of the stator windings 86-90 of the PMM as detected by a current sensor 114. This current sensor detects when an over-current condition has arisen and causes the converter control loop 44 to reduce the duty cycle of the transistors Q1-Q6 as needed to limit the current in the windings 86-90.

Figure 3:
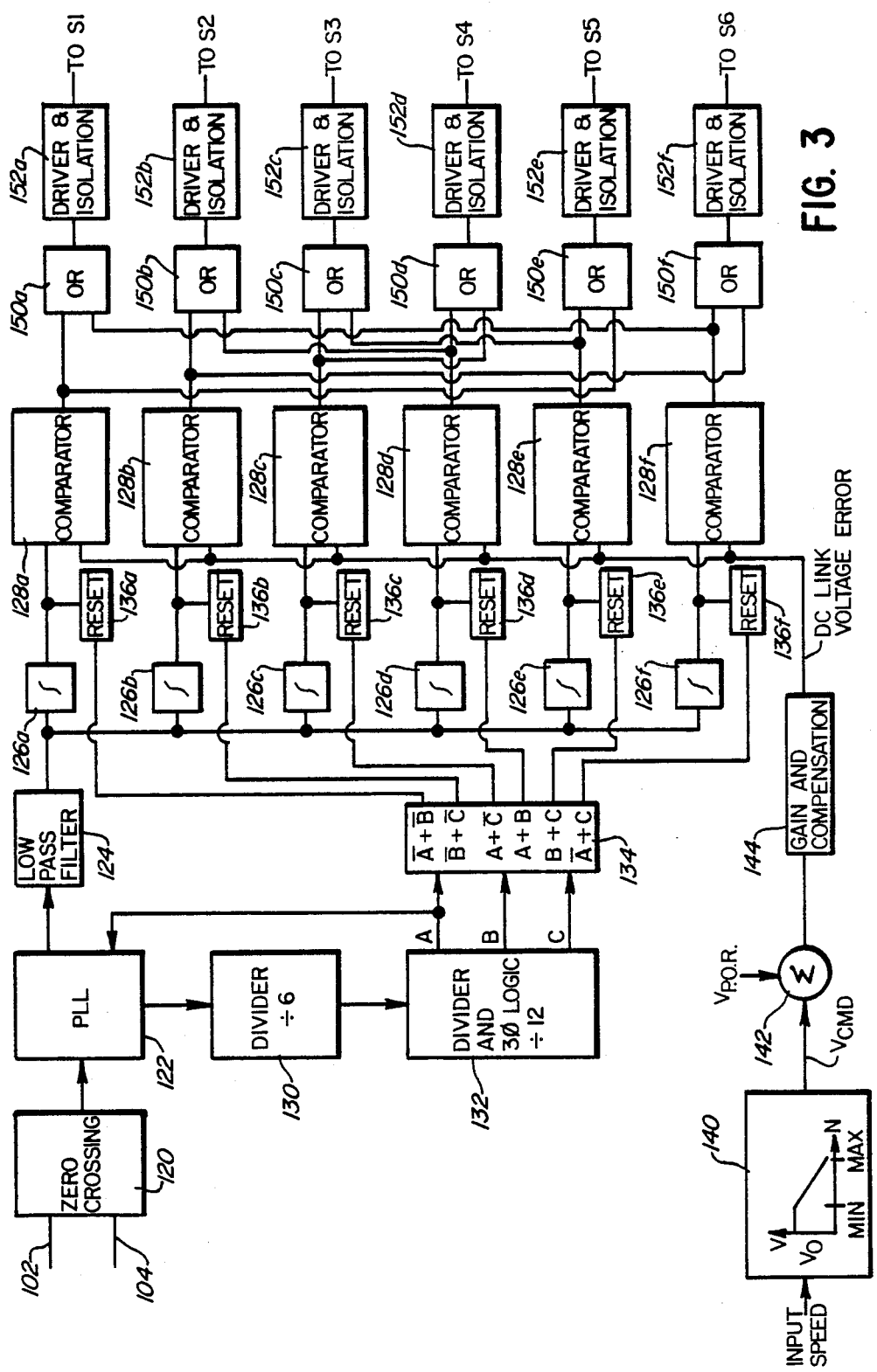
FIG. 3 is a block diagram of the AC/DC converter control shown in FIG. 2.

Referring now to FIG. 3, there is shown in block diagram form the AC/DC converter control loop 48 for controlling the SCR's S1-S6. A zero crossing detector 120 receives the phase voltages on the lines 102, 104 and produces a pulse each time the phase-to-phase voltage passes through zero. The series of pulses thus produced are coupled to a phase-locked loop or PLL 122. The PLL 122 and a low pass filter 124 together develop a DC signal representing the phase-to-phase voltage of the PMG. The output of the low pass filter 124 is coupled to six integrators 126A-126F, each of which develops an integrated signal that is coupled to one input of a comparator 128A-128F respectively.

The PLL 122 also includes a voltage-controlled oscillator (not shown) that develops an AC waveform which is coupled to a first divider 130 and then to a further divider and three-phase logic circuit 132. The circuit 132 develops three signals a, b and c which are combined according to the six logical equations shown in block 134 to produce a series of six reset signals that are applied through reset circuits 136A-136F to the first inputs of the comparators 128A-128F respectively.

Each of the comparators 128A-128F includes a second input which receives a link voltage error signal. The error signal is derived in part by a function generator, block 140, which receives the signal developed by the speed sensor 46 or the current sensor 100 and which derives therefrom a DC link voltage command signal $V_{CMD}$ according to a schedule represented by the graph within the block 140. The signal $V_{CMD}$ represents the magnitude of the DC voltage on the DC link 108 required to operate the PMM at the required speed. The signal $V_{CMD}$ is compared with a signal $V_{POR}$ representing the actual voltage on the DC link 108 by a summing junction 142 and the resulting error signal is modified by a gain and compensation circuit 144 to produce the DC link voltage error signal.

The comparators 128A-128F are coupled to a series of gates 150A-150F which are in turn coupled through driver and isolation circuits 152A-152F to the gates of the SCR's S1-S6.

The AC/DC converter control 48 is described in an article entitled "Design of a Twenty-Five KW (Peak) 3-Phase Full Wave Bridge Regulator" by Chetty et al. appearing in the PCI April 1983 proceedings and such article is incorporated by reference herein.

As should be evident, for any given speed of the input shaft, the speed that must be provided by the PMM to the differential speed summer 18 is known. For any torque and speed of the PMM there is a DC bus voltage and a commutation angle, i.e. the phase difference between the applied voltage from the inverter 56 and the back EMF of the PMM, which will allow the PMM to operate at maximum efficiency. Analysis of the ECCSD 10 has shown that the voltage on the DC bus 108 required at any speed of the PMM varies only slightly for the full range of torque output from the PMM. Thus, it is possible to control the DC bus voltage solely as a function of input speed to the drive 10. The sacrifice in system efficiency is believed to be insignificant.

For any operating speed of the PMM, the proper DC bus voltage is provided by the AC/DC converter control loop 48, the AC/DC converter 54 and the filter 58. Consequently, the magnitude of the voltage applied to the windings 86, 88 and 90 of the PMM is determined by the AC/DC converter 54 and no voltage control, such as a pulse width modulation scheme, need be implemented by the DC/AC converter control 44.

Figure 4:
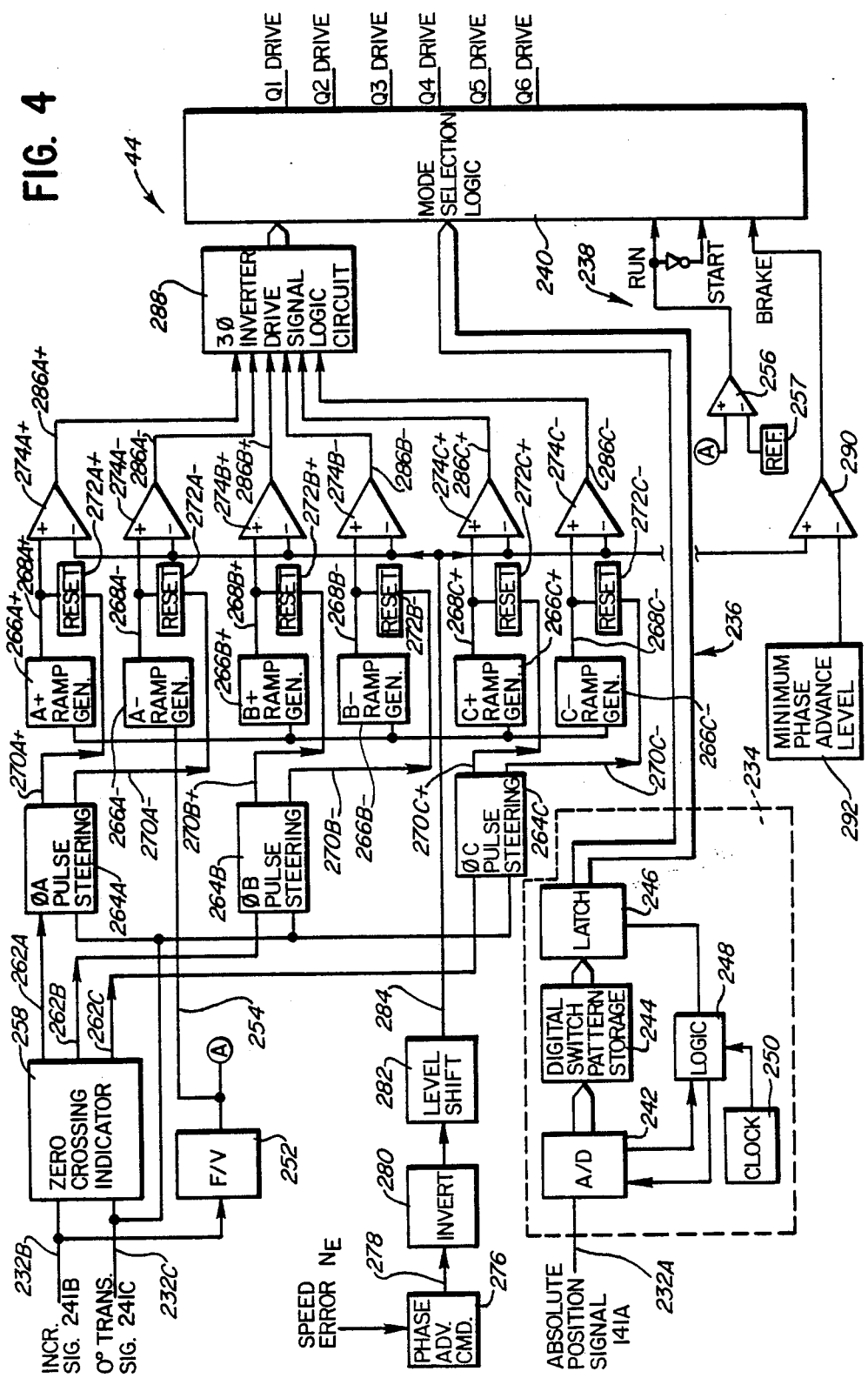
FIG. 4 is a block diagram of the DC/AC converter control shown in FIG. 2.

With reference to FIG. 4, a block diagram illustrates the inverter control 44 in greater detail. The control 44 includes a start circuit 234, a run circuit 236, a mode selection circuit 238 and a mode drive logic circuit 240. The start and run circuits 234, 236, respectively, provide logic signal to the mode drive logic circuit 240 which selectively controls the switches Q1-Q6 in accordance with the mode selection circuit 238.

The converter control 44 is described and claimed in Disher et al U.S. patent application Ser. No. 138,024, filed Dec. 28, 1987, entitled "Brushless DC Motor Control", assigned to the assignee of the instant application and the disclosure of which is hereby incorporated by reference. The control circuit 44, as previously mentioned, is responsive to the rotor position sensor 110. The position sensor 110 develops three separate output signals, illustrated in FIG. 5, representing the position of the motive power shaft 34 of the PMM. More particularly, the sensor 110 generates an analog position signal represented by waveform 241A having a magnitude proportional to the angular displacement of the motive power shaft from a predetermined fixed position. An incremental position signal represented by waveform 241B is also developed by the position sensor 110 and comprises a pulse train wherein a pulse is generated for each 10 degree increment of angular displacement of the motive power shaft 34. In addition, the sensor 110 generates a transition signal represented by waveform 241C, comprising a single pulse which is developed each time the motive power shaft 34 passes a further predetermined, fixed position.

The incremental position signal represented by the waveform 241B does not indicate absolute position of the rotor. Thus, if it is desired to start the PMM from standstill, the absolute position signal represented by the waveform 241A is used. The start circuit 234 includes an A-to-D converter 242 which receives the absolute position signal on a line 232A and converts the analog position value to a digital value. The A-to-D converter 242 is coupled to a digital switch pattern storage circuit 244 which may comprise, for example, an EPROM. The pattern storage circuit 244 is in turn coupled to a latch 246 which stores the selected pattern until the pattern is updated by a logic circuit 248 in response to a clock signal provided by a clock 250.

The start circuit 234 is utilized only with lower rotational speeds of the PMM since the A to D conversion cycle time is not fast enough to effectively control the PMM at higher speeds.

The incremental signal 241B is coupled by a line 232B to a frequency-to-voltage converter 252 which generates a signal on a line 254 representing motor speed. The speed signal on the line 254 is coupled to a non-inverting input of a comparator 256. An inverting input of the comparator 256 receives a reference signal from a reference signal generator 257 representing a preselected minimum normal operating speed for the PMM. When the rotor speed of the PMM exceeds the reference speed, the mode selection circuit 238 switches the mode drive logic circuit 240 from the start mode to the run mode.

The run circuit 236 includes a zero crossing detector 258 which receives the incremental signal on the line 232B and the zero transition signal on a line 232C and generates output signals on lines 262A-262C. A pulse is developed on the line 262A at the beginning of a certain time prior to the time when phase A of the PMM back emf passes through zero. Similarly, pulses are developed on the lines 262B and 262C at the beginning of certain time periods prior to the times when the phase B and phase C back emf waveforms, respectively, pass through zero. The certain time periods are equal in length and the length is determined by the physical angular position of the sensor 110 relative to an arbitrary, fixed mechanical zero degree position of the motive power shaft 34. The length in turn determines the maximum possible phase advance or commutation angle, i.e. the phase displacement of the voltage applied to the PMM relative to the back emf thereof.

The signals on the lines 262A-262C are coupled to pulse steering circuits 264A-264C, respectively. The steering circuits 264A-264C also receive the zero degree transition signal represented by the waveform 241C on the line 232C.

A series of six ramp generators 266A+, 266A-, 266B+, 266B-, 266C+, 266C- receive the output of the frequency to voltage converter 252 on the line 254 and generate a series of ramp signals each having a slope corresponding to the speed of the rotor 34.

Each pulse steering circuit 264A-264C develops a pair of output signals on lines 270A+, 270A- or 270B+, 270B- or 270C+ or 270C-, respectively, which is coupled to a reset circuit. Each reset circuit 272 includes an output coupled to the output of one of the ramp generators 266. The pulse steering circuits 264A-264C are operable to reset and hold or to release the generator ramp signal from the blocks 266 to provide a periodic sawtooth or resettable ramp signal for each switch. The ramp signals on the line 268 are coupled to non-inverting inputs of comparators 274A+, 274A-, 274B+, 274B-, 274C+, 274C-. Inverting inputs of the comparators 274 receive a signal developed by a phase advance command circuit 276, an inverter 280 and a level shift circuit 282. The phase advance command circuit 276 develops a phase advance command signal representing a commanded phase advance in dependence upon the speed error signal $N_E$. The phase advance command circuit varies the phase advance command signal as a function of speed error to vary motor torque and thereby bring the speed error down to zero.

It should be noted that the phase advance command circuit 276 may alternatively be responsive to a different signal, if desired.

Inasmuch as a nonlinear relationship exists between torque and phase advance, i.e. commutation angle, it may be desirable to include a gain and compensation function within the circuit 276 to achieve an optimum torque-speed relationship of the PMM.

The signal developed by the level shift circuit 282 comprises a conditioned phase advance command signal which decreases when the phase advance command signal increases and increases when the phase advance command signal decreases.

Each comparator 274 compares its resettable ramp signal on the line 268 to the conditioned phase advance command signal on the line 284 and develops a drive signal on line 286. Each comparator 274 develops a high state output signal when the level of the ramp signal on the line 268 exceeds the level of the conditioned phase advance command signal on line 284. An inverter drive signal logic circuit 288 receives the drive signals on the line 286. The logic circuit 288 is in turn coupled to the mode drive logic circuit 240.

Taking the circuitry for controlling the switches Q1 and Q4 in the inverter 56 as an example, when the signal developed by the ramp generator 266A+ exceeds the conditioned phase advance command signal provided on the line 284, the output of the comparator 274A switches to a high state. At this time, the inverter drive signal logic circuit 288 and the mode drive logic circuit 240 turn on the transistor Q1 and turn off the transistor Q4 via base drive circuits (not shown).

At the next occurrence of a pulse on the line 262A from the zero crossing detector circuit 258, the pulse steering circuit 265A issues a reset command on the line 270A+ and releases a reset command previously imposed on the line 270A-, thus allowing the output on the line 268A- from the ramp generator 266A- to begin ramping upwardly. The output of the comparator 274A+ changes to a low state upon issuance of the reset command on the line 270A+; however, the inverter drive signal logic circuit 288 maintains Q1 on and Q4 off until the ramp signal on line 268A- exceeds the signal on line 284, at which time Q1 is turned off and Q4 is turned on via the base drive circuits.

The control of the remaining switches Q2, Q5 and Q3, Q6 is identical except that the signals for controlling same are shifted 120 degrees and 240 degrees in time, respectively.

In the inverter control 44 of the present invention, an increase in the magnitude of the phase advance of the command signal causes the level of the conditioned command signal on the line 284 to decrease. Hence, each resettable ramp signal crosses the conditioned phase advance command signal at a sooner point in time, resulting in the switch control signals being advanced in time. Conversely, a decrease in the phase advance command signal results in an increase in the level of the conditioned phase advance command signal. This, in turn, causes the switch control signal to retreat in time to provide less phase advance.

The conditioned phase advance command signal 284 is also coupled to a noninverting input of a comparator 290. The input of the comparator 290 receives the signal from a generator 292 representing the minimum phase advance value at which output torque is zero. If braking of the PMM is needed, the conditioned phase advance command signal exceeds the minimum phase advance value, in turn causing the output of the comparator 290 to assume a high state. This causes the mode select logic circuit 240 to switch to a braking mode of operation. In this mode, the three inverter switches Q4, Q5 and Q6 are turned on simultaneously so that the PMM 1 develops the required braking torque. A voltage clamp circuit 300 may be coupled across the capacitor C as shown in FIG. 2 to prevent large voltage buildup across such capacitor as a result of operation in the braking mode.

Further details on the operation of the inverter control 44 may be had by reference the above-identified patent application.

The present ECCSD operates on only one side of the straight-through condition, and hence there is no need to configure the power converter 52 for bidirectional power flow. Also, the permanent magnet machines (i.e. the PMG and the PMM) do not have to operate both as a motor and as a generator, and hence control of the machines is simplified. In addition, the independence of the control loops for these machines simplifies the design and testing of same.

What is claimed is:

1. An electrically compensated constant speed drive (ECCSD) for developing constant-speed motive power at a drive output shaft from variable-speed motive power provided by a prime mover at an ECCSD input shaft wherein the speed of the input shaft is limited so that such speed is equal to or less than the speed required to maintain the drive output shaft at a desired speed, comprising:
   a differential having a first input coupled to the input shaft, a second input and an output coupled to the output shaft;
   a permanent magnet generator (PMG) having a motive power shaft coupled to the input shaft and electrical power windings which develop AC power;
   a permanent magnet motor (PMM) having a motive power shaft coupled to the second differential input and electrical power windings;
   an AC/DC converter coupled to the electrical power windings of the PMG for developing a DC voltage on a DC link from the AC power developed by the PMG;
   a DC/AC converter coupled between the AC/DC converter and the electrical power windings of the PMM for developing AC power from the DC power developed by the AC/DC converter to operate the PMM;
   a first control means for controlling the AC/DC converter responsive to an operating parameter of the PMG; and
   a second control means operationally independent of the first control means for controlling the DC/AC converter whereby the PMM develops compensating motive power at a speed sufficient to maintain the drive output shaft at the desired speed.

2. The ECCSD of claim 1, wherein the second control means includes means for sensing the speed of the drive output shaft.

3. The ECCSD of claim 2, wherein the second control means includes means for deriving a speed error signal representing the deviation of the speed of of the drive output shaft from the desired speed and means for operating the DC/AC converter in accordance with the error signal.

4. The ECCSD of claim 3, further including a position sensor for detecting the position of the motive power shaft of the PMM and wherein the operating means is responsive to the position sensor.

5. The ECCSD of claim 1, wherein the first control means includes means for deriving a DC link voltage command signal from the speed of the input shaft of the ECCSD representing the magnitude of the DC voltage on the DC link required to operate the PMM and means for deriving an error signal from the DC link voltage command signal whereby the error signal is used to control the AC/DC converter.

6. An electrically compensated constant speed drive (ECCSD) for developing a drive output shaft motive power at a desired constant output speed from motive power at a variable speed developed at an input shaft of the drive, wherein the speed at the input shaft of the drive is limited to be equal to or less than the speed required to maintain the desired constant output speed, comprising:
   a speed summer having first and second input shafts and an output coupled to the drive output shaft wherein the first input shaft is coupled to the drive input shaft;
   a first permanent magnet machine having a motive power shaft coupled to the drive input shaft to be driven thereby and electrical power windings which develop AC power in response to driving of the motive power shaft;
   a second permanent magnet machine having a motive power shaft coupled to the second input shaft of the speed summer and also including electrical power windings;
   an AC/DC converter coupled to the electrical power windings of the first permanent magnet machine for converting the AC power developed by the first permanent magnet machine into DC power;
   A Dc/AC converter coupled between the AC/DC converter and the electrical power windings of the second permanent magnet machine for developing an AC voltage at a controllable frequency;
   means for generating a speed error signal representing the difference between the desired constant speed and actual speed of the speed summer output shaft;
   a first control means for controlling the AC/DC converter in accordance with the speed of the input shaft of the drive, whereby a magnitude of the AC voltage developed by the DC/AC converter is determined by the AC/DC converter; and
   a second control means operationally independent of the first control means for controlling the DC/AC converter in response to the speed error signal so that the second permanent magnet machine develops compensating speed of a magnitude sufficient to maintain the speed summer output shaft at the desired speed.

7. The ECCSD of claim 6, wherein the AC/DC converter is coupled to the DC/AC converter by a DC link and further including means for deriving a DC link voltage command signal from the speed of the input shaft of the drive representing the magnitude of the DC voltage on the DC link required to operate the second permanent magnet machine at the necessary speed magnitude and torque and means for deriving a further error signal from the DC link voltage command signal whereby the further error signal is used to control the AC/DC converter.

8. The ECCSD of claim 6, further including a position sensor for detecting the angular position of the motive power shaft of the second permanent magnet machine and wherein the second control means is further responsive to the position sensor.

* * * * *